(12) United States Patent
Lee

(10) Patent No.: US 7,698,082 B2
(45) Date of Patent: Apr. 13, 2010

(54) REAL TIME ERROR DETERMINATION FOR INERTIAL INSTRUMENTS

(75) Inventor: Charles A. Lee, Camarillo, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 35 days.

(21) Appl. No.: 12/154,104

(22) Filed: May 20, 2008

(65) Prior Publication Data

US 2009/0292497 A1    Nov. 26, 2009

(51) Int. Cl.
*G01D 18/00* (2006.01)
*G01C 21/28* (2006.01)

(52) U.S. Cl. .......................... 702/88; 701/220

(58) Field of Classification Search .................... 702/88, 702/89; 701/220, 221
See application file for complete search history.

(56) References Cited

U.S. PATENT DOCUMENTS 7,103,477 B1 *    9/2006    Lee ........................... 701/220
2006/0055584 A1 *    3/2006    Waite et al. ................. 342/22

* cited by examiner

*Primary Examiner*—Bryan Bui
(74) *Attorney, Agent, or Firm*—Carmen Patti Law Group, LLC

(57) ABSTRACT

First and second inertial instruments have parallel sense axes and produce respective first and second output signals using associated first and second scale factors. Bias errors are estimated using the change in state of sign of the first and second scale factors. A substitute scale factor is determined to be an equivalent of the second scale factor and is based on the first scale factor and a difference between the first and second scale factors. Errors in the second scale factor are calculated based on the first scale factor and the substitute scale factor where a sign of one of first and second scale factors changes going from the first time interval to the succeeding time intervals. First and second corrected output signals are generated based on the respective first and second output signals and correction of the second scale factor error.

8 Claims, 2 Drawing Sheets

REAL TIME ERROR DETERMINATION FOR INERTIAL INSTRUMENTS

BACKGROUND

This invention relates to inertial instruments such as gyroscopes and accelerometers, and more specifically to the detection of errors in real time for inertial instruments providing the ability to correct for such errors while the inertial instruments remain in operation.

The ability to independently reverse the sign of the scale factor (SF) terms for gyros is described in U.S. Pat. No. 7,103,477. A solution is described for scale factored input rates for two gyros A and B involving equations with scale factors (SFA and SFB), and bias terms (BiasA and BiasB). However, if SFA and/or SFB are in disagreement, the results of the equations are adversely affected.

SUMMARY

An exemplary inertial measurement apparatus in accordance with the present invention has first and second inertial instruments that are oriented to have parallel sense axes and that produce respective first and second sensed output signals representative of an inertial attribute to be measured. Respective first and second scale factors are used in producing the first and second sensed output signals. A substitute scale factor is determined to be an equivalent of the second scale factor and is based on the first scale factor and a difference between the first and second scale factors. Differences in the first and second scale factors are calculated based on the first scale factor and the substitute scale factor during first and second time intervals where a sign of one of first and second scale factors changes from one state during the first time interval to the other state during the second time interval. First and second corrected output signals are generated based on the respective first and second sensed output signals and correction of said second scale factor error.

A method for implementing error corrections is a further embodiment of the present invention.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition of the difficulties associated with inertial instrument errors in the scale factors, especially in a real time environment in which it is desirable maintain the inertial instruments in continuing operation while minimizing such errors.

Figure 1:
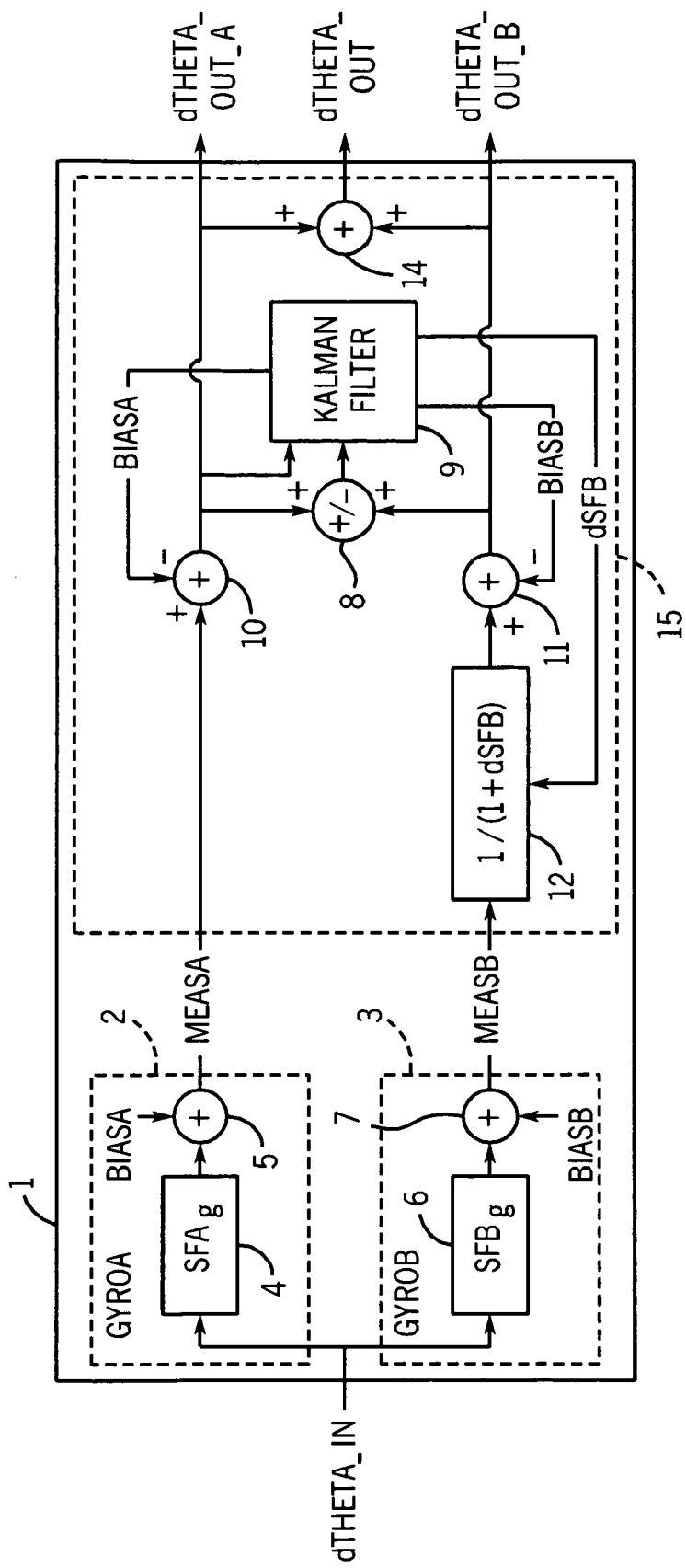
FIG. 1 is a functional diagram of an exemplary embodiment of an inertial instrument in accordance with the present invention.

FIG. 1 is a functional representation of an exemplary embodiment of an inertial instrument 1 in accordance with the present invention. Computer algorithms implemented by a micro processing unit 15 compute gyro bias errors and scale factor imbalance in the manner described herein. Gyroscopes 2 and 3 having parallel sensing axes sense the same true input rate, dTheta_in, with scale factors 4 and 6, and bias errors 5 and 7, respectively. The resulting measurement outputs MEASA and MEASB from the respective instruments are input to a micro processing unit 15 and operated on by a hosted algorithm further described herein. A Kalman Filter 9 implemented in the microprocessor computes the bias errors, BiasA and BiasB, of each instrument and the scale factor imbalance 12 between the instruments. Gyro measurements are corrected by the resulting computations and feedback of bias summations 10, 11 and scale factor imbalance 12, combined and provided as output dTheta_out based on summation 14. Summation 8 of the corrected gyro measurements have a controlled sign output in accordance with the present invention and is an input to the Kalman Filter.

Figure 2:
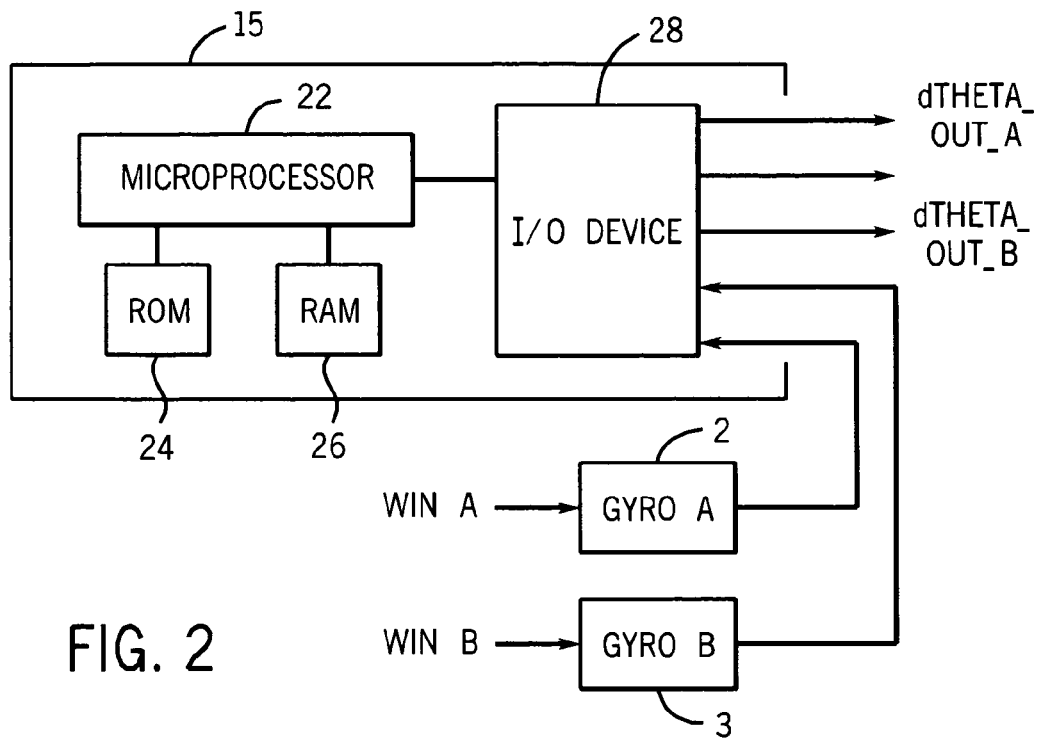
FIG. 2 is a block diagram of an exemplary embodiment of an inertial instrument suited to carry out the functions of FIG. 1.

FIG. 2 is a block diagram of an exemplary embodiment of an inertial instrument 1 in accordance with the present invention. Micro processing unit 15 includes a microprocessor 22 is supported by read only memory (ROM) 24 and a random access memory (RAM) 26. Microprocessor 22 is coupled to an input/output device 28 that supports receiving and transmitting digital signals as shown. The microprocessor 32 operates under stored program control instructions that may be contained initially in ROM 24. Operational instructions as well as data are stored in RAM 26 for processing by microprocessor 32. Those skilled in the art will be able to provide appropriate software or firmware control instructions for microprocessor 22 in order to implement the functions and calculations discussed herein. A gyroscope "Gyro" A 2 and a gyro B 3 generate respective outputs of an angular measurement such as measured in degrees coupled to I/O device 28. The input information sensed by these gyros, which have parallel sense axes, is represented as MeasA and MeasB. The outputs calculated by MPU 15 for gyros 2 and 3 are represented by dTheta_out_A and dTheta_out_B, respectively. The output dTheta_out calculated by MPU 15 is a dynamically computed output of an angle based on inputs from gyros 2 and 3. As will be explained below, the output dTheta_out is corrected based on real time measurement of the bias errors of the two gyros, and any imbalance between the scale factors of the two gyros while the gyros operate continuously in a dynamic environment.

Alternatively, the functions and calculations can be implemented in an application specific integrated circuit or other form of hardware implementation. In addition to the functionality and calculations made by the instrument 15, additional functionality provided by the two or more gyros could be incorporated into a single device.

The bias errors may be directly observable if the sense axes of two instruments, gyroscopes (gyros) in this exemplary embodiment, are located along the same axis relative to the attribute being sensed and are sequenced as described. Both gyros sense rotations about the same axis. The measurements MeasA and MeasB made by gyros A and B during each $i^{th}$ measurement interval are:

$$\text{Meas}A(i) = \text{SF}A * d\text{Theta\_in} + \text{Bias}A * \text{Ti} \quad \text{(Eq1)}$$

$$\text{Meas}B(i) = \text{SF}B * d\text{Theta\_in} + \text{Bias}B * \text{Ti} \quad \text{(Eq2)}$$

where:

MeasA and MeasB are the measurement of incremental angle made by two gyros A and B, respectively;

dTheta_in is the true input angle displaced by the two gyros A and B having parallel sense axes;

SFA and SFB are the scale factor coefficients of gyros A and B respectively which relate the physical output of the gyros to input angle;

Ti is the time interval over which the two gyros are angularly displaced.

Independently reversing the sign of the scale factor terms of each gyro yields equations:

$$MeasA(i) = KmodeA*SFA*dTheta\_in + BiasA*Ti \quad (Eq3)$$

$$MeasB(i) = KmodeB*SFB*dTheta\_in + BiasB*Ti \quad (Eq4)$$

where:

KmodeA and KmodeB independently take on the values of +1 or −1 to provide a sequence of measurements in which the scale factor terms are reversed.

The 8 equations for the combination of Kmode values are:

$$MeasA(1) = +1*SFA*dTheta\_in + BiasA*Ti \quad (Eq5)$$

$$MeasB(1) = +1*SFB*dTheta\_in + BiasB*Ti \quad (Eq6)$$

$$MeasA(2) = +1*SFA*dTheta\_in + BiasA*Ti \quad (Eq7)$$

$$MeasB(2) = -1*SFB*dTheta\_in + BiasB*Ti \quad (Eq8)$$

$$MeasA(3) = -1*SFA*dTheta\_in + BiasA*Ti \quad (Eq9)$$

$$MeasB(3) = -1*SFB*dTheta\_in + BiasB*Ti \quad (Eq10)$$

$$MeasA(4) = -1*SFA*dTheta\_in + BiasA*Ti \quad (Eq11)$$

$$MeasB(4) = +1*SFB*dTheta\_in + BiasB*Ti \quad (Eq12)$$

These 8 equations provide a solution for the four scale factored input rates SFA*dTheta_in through SFA*dTheta_in4, and the two bias terms BiasA and BiasB.

In this embodiment the term SFB is modeled as:

$$SFB = SFA*(1+dSFB) \quad (Eq13)$$

where dSFB is the difference between SFA and SFB.

Substituting the equivalent of SFB from Eq13 into Eq3 and Eq4 yields:

$$MeasA(i) = KmodeA*SFA*dTheta\_in + BiasA*Ti \quad (Eq14)$$

$$MeasB(i) = KmodeB*(SFA + SFA*dSFB)*dTheta\_in + BiasB*Ti \quad (Eq15)$$

If the measurements MeasA and MeasB over successive intervals are summed or differenced, the product of SFA*dTheata_in(i) can be made to drop out, leaving a remainder containing elements of dSFB*SFA*dTheta_in, BiasA and BiasB.

The differencing of the A and B gyro measurements may be selected to provide observability of the bias errors and scale factor imbalance. A sequence of KmodeA, KmodeB and summing or differencing of equations Eq14 and Eq15 can be found that makes the errors dSFB, BiasA and BiasB observable as frequency and phase multiplexed signals in the combined measurement from gyroscopes A and B; this is explained in more detail below.

$$MeasA(i) = KA*(KmodeA*SFA*dTheta\_in + BiasA*Ti) \quad (Eq16)$$

$$MeasB(i) = KB*(KmodeB*(SFA + SFA*dSFB)*dTheta\_in + BiasB*Ti) \quad (Eq17)$$

In the above equations Eq16 and Eq17 coefficients KmodeA and KmodeB represent the sign of the A and B gyro scale factors, respectively. The coefficients KA and KB are also given the values of +/−1. Values of KA, KB, KmodeA and KmodeB are selected to force the following:

$$(KA*KmodeA + KB*KmodeB)*dTheta\_in(i) = 0 \quad (Eq18)$$

KA and KB serve to control whether Eq16 and Eq17 are summed or differenced, and to control the order of difference: Eq16−Eq17 or Eq17−Eq16.

Figure 3:
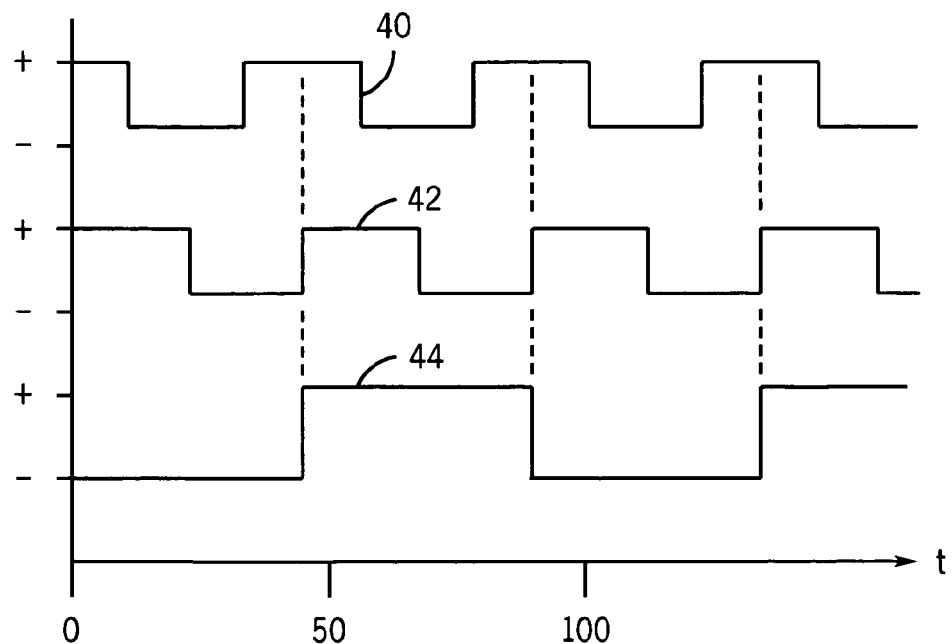
FIG. 3 is a graph illustrating the polarity of signals associated with two exemplary gyroscopes.

FIG. 3 is a graph that shows a sequence of the polarity of determinable errors resulting from sequential sums and differences of equations Eq16 and Eq17. These results can be achieved by selecting appropriate values KA, KB, KmodeA and KmodeB so that summing Eq16 and Eq17 satisfies Eq18. When Eq18 is satisfied, the resulting summation of Eq16 and Eq17 yields:

$$MeasA(i) + MeasB(i) = KA*BiasA*Ti + \quad (Eq18a)$$
$$KB*KmodeB*dSFB*SFA*dTheta\_in(i) + KB*BiasB*Ti$$

The summation of Eq16 and Eq17, assuming Eq18 is satisfied, has only terms containing the errors desired. Neglecting the product containing dSFB*SFA*dTheta_in for the moment, by sequentially alternating the signs of KA and KB, the effect of BiasA and BiasB on Eq18a changes sign, effectively "modulating" the error caused by these terms in the summation Eq18a. Waveforms 40 and 42 represent this effect from BiasB and BiasA, respectively.

The effect of dSFB on Eq18a is affected only by KmodeB. Changing the sign of the scale factor of GyroB in FIG. 1 reverses the sign of KmodeB and changes the sign of the error caused by dSFB in Eq18a. KmodeB can be selected to achieve a waveform such as waveform 44 in FIG. 2. Waveform 44 appears at a different frequency from that of waveforms 40 and 42, and thus the effect of dSFB on Eq18a can be separated from that of BiasA and BiasB. The value for SFA*dTheta_in(i) in Eq18a is, to first order, the value at the output of summation 10 in FIG. 1. As the value for BiasA is refined by the Kalman Filter process 9 in FIG. 1, this correlation becomes stronger.

Once a sequence for KA, KB and KmodeB are selected, KmodeA, the sign of the scale factor of Gyro A, can be selected to force the condition prescribed by Eq18. The result is that BiasA, BiasB, and dSFB appear in the summation of Eq16 and Eq17 as square waves correlated with FIG. 2 waveforms 40, 42 and 44 respectively. These square waves are separated by phase, as in waveforms 40 and 42 for BiasA and BiasB respectively, and by frequency as in the case of waveform 44 for dSFB. These correlations are effectively amplitude modulations of the respective errors impressed on the summation of Eq16 and Eq17. Subsequent demodulation of the summation of Eq16 and Eq17 with the waveforms in FIG. 2 will yield the value of the underlying errors.

Exemplary instrument 10 implements a Kalman filter to demodulate the error signals shown in FIG. 2 and uses the observation of values at each 'i' interval:

$$Z(i) = [KB(i)*KmodeB(i)*SFA*dTheta\_in(i), \quad (Eq19)$$
$$KA(i)*Ti, KB(i)*Ti]*[dSFB, BiasA, BiasB]^T$$

The Kalman filter H matrix for each observation is:

$$H(i) = [KB(i)*KmodeB(i)*SFA*dTheta\_in(i), KA(i)*Ti,$$
$$KB(i)*Ti] \quad (Eq20)$$

Those skilled in the art will understand the operation of the Kalman Filter with regard to Z(i) and H(i).

All of the elements within the H matrix are known at each interval: KA, KB, KmodeA, KmodeB and the raw (uncorrected) measurement from gyro A, i.e. SFA*dTheta_in(i). Hence, the above process can be applied recursively by instrument 1 to determine the real time measurement of the bias errors of gyros A and B, and the imbalance (if any) between the scale factors of gyros A and B. The output dTheta_out of instrument 1 consists of a constantly updated angle measurement based on the raw output from gyros A and B, and as corrected to compensate for any bias and/or scale factor errors determined as explained above. Thus, correction of such errors is implemented while the gyros continuously operate in a dynamic environment, i.e. dynamic updates are performed during times where the gyro inputs are subject to change.

With regard to the illustrative embodiment, a digital implementation will contain counts, i.e. numerical values, corresponding to inputs and outputs of the inertial instrument measurements from two parallel instrument inputs/channels Win(A) and Win(B). The instrument 10 preferably processes the required inputs and generates outputs in substantially real time.

Although exemplary implementations of the invention have been depicted and described in detail herein, it will be apparent to those skilled in the art that various modifications, additions, substitutions, and the like can be made without departing from the spirit of the invention. The above implementation, described in terms of a gyroscope, is equally applicable to a pair of accelerometers having controllable reversibility of the sign of the scale factors.

The scope of the invention is defined in the following claims.

I claim:

1. An inertial measurement apparatus comprising:

first and second inertial instruments are oriented to have parallel sense axes and produce respective first and second sensed output signals representative of an inertial attribute to be measured, the first and second inertial instruments use respective first and second scale factors which are reversible in sign in producing the first and second sensed output signals;

means for receiving said first and second sensed output signals and for accessing the first and second scale factors;

means for determining a substitute scale factor as an equivalent of the second scale factor based on the first scale factor and a difference between the first and second scale factors;

means for calculating differences in the first and second scale factors based on the first scale factor and the substitute scale factor during first and second time intervals where a sign of one of first and second scale factors changes from one state during the first time interval to the other state during the second time interval;

means for sequencing the reversal of the signs of the first and second scale factors and for combining the corresponding outputs from the first and second gyros to measure the bias errors of the first and second gyros and the difference between the scale factors of the first and second gyros;

means for generating first and second corrected output signals based on the respective first and second sensed output signals and correction of said first and second scale factor errors;

the generating means generating first and second corrected output signals based on measurement of the first and second sensed output signals over multiple successive time intervals and arithmetically combining the sensed output signals over the multiple successive time intervals so that certain components that make up the first and second sensed output signals cancel each other.

2. The apparatus of claim 1 wherein the first and second inertial instruments also use respective first and second bias values to generate the first and second output signals, the apparatus further comprising:

said accessing means accessing the first and second bias values;

said calculating means calculating an error in the first and second bias values based on the bias values during multiple successive time intervals;

said generating means generating first and second corrected output signals based on the respective errors in the first and second bias values and correction of said first and second bias value errors.

3. The apparatus of claim 1 wherein the differences between the first and second scale factors are based on equations:

$$\text{Meas}A(i) = \text{Kmode}A * SFA * d\text{Theta\_in} + \text{Bias}A * Ti$$

$$\text{Meas}B(i) = \text{Kmode}B * (SFA + SFA * dSFB) * d\text{Theta\_in} + \text{Bias}B * Ti$$

where:

MeasA(i) and MeasB(i) are the measurement of incremental angle made by two gyros A and B, respectively;

KmodeA and KmodeB independently take on the values of +1 or −1 to provide a sequence of measurements in which the scale factor terms are reversed;

BiasA and BiasB are the respective bias errors;

dTheta_in is the true input angle displaced by the two gyros A and B having parallel sense axes;

SFA and SFB are the scale factor coefficients of gyros A and B respectively which relate the physical output of the gyros to input angle;

Ti is the time interval over which the two gyros are angularly displaced.

4. The apparatus of claim 1 further comprising means for generating a third corrected output signal representative of a value of the inertial attribute, where the third output signal is an average of the first and second corrected output signals.

5. A method for correcting errors in first and second sensed output signals representative of an inertial attribute being measured, the method comprising the steps of:

said first and second sensed output signals being generated by first and second inertial instruments oriented to have parallel sense axes;

producing the first and second sensed output signals by using respective first and second scale factors;

receiving said first and second sensed output signals and accessing the first and second scale factors;

determining a substitute scale factor as an equivalent of the second scale factor based on the first scale factor and a difference between the first and second scale factors;

calculating differences between the scale factor based on the first scale factor and the substitute scale factor during first and subsequent time intervals where a sign of one of first and second scale factors changes from one state during the first time interval to the other state during the succeeding time intervals;

generating first and second corrected output signals based on the respective first and second sensed output signals and correction of said second scale factor error;

generating first and second corrected output signals based on measurement of the first and second sensed output signals over multiple successive time intervals and arithmetically combining the sensed output signals over the multiple successive time intervals so that certain components that make up the first and second sensed output signals cancel each other.

6. The method of claim 5 wherein respective first and second bias values are also used to generate the first and second output signals, the method further comprising the steps of:

accessing the first and second bias values;

calculating an error in the first and second bias values based on the bias values during the first and succeeding time intervals;

generating first and second corrected output signals based on the respective errors in the first and second bias values and correction of said first and second bias value errors.

7. The method of claim 5 wherein the errors in the second scale factor are based on equations:

$$MeasA(i) = KmodeA * SFA * dTheta\_in + BiasA * Ti$$

$$MeasB(i) = KmodeB * (SFA + SFA * dSFB) * dTheta\_in + BiasB * Ti$$

where:
MeasA(i) and MeasB(i) are the measurement of incremental angle made by two gyros A and B, respectively;
KmodeA and KmodeB independently take on the values of +1 or −1 to provide a sequence of measurements in which the scale factor terms are reversed;
BiasA and BiasB are the respective bias errors;
dTheta_in is the true input angle displaced by the two gyros A and B having parallel sense axes;
SFA and SFB are the scale factor coefficients of gyros A and B respectively which relate the physical output of the gyros to input angle;
Ti is the time interval over which the two gyros are angularly displaced.

8. The method of claim 5 further comprising the step of generating a third corrected output signal representative of a value of the inertial attribute, where the third output signal is an average of the first and second corrected output signals.

* * * * *